US007147888B2

(12) United States Patent
Brown et al.

(10) Patent No.: US 7,147,888 B2
(45) Date of Patent: *Dec. 12, 2006

(54) EMULSION IMPREGNATED RAWHIDE CHEWS

(75) Inventors: Dale G. Brown, Wharton, TX (US); Ira D. Hill, Stafford, TX (US); Ron Butler, Mission, KS (US); Robert Islinger, Overland Park, KS (US)

(73) Assignee: Whitehill Oral Technologies, Inc., Stafford, TX (US)

( * ) Notice: Subject to any disclaimer, the term of this patent is extended or adjusted under 35 U.S.C. 154(b) by 257 days.

This patent is subject to a terminal disclaimer.

(21) Appl. No.: 10/361,225

(22) Filed: Feb. 10, 2003

(65) Prior Publication Data

US 2004/0156883 A1 Aug. 12, 2004

(51) Int. Cl.
*A61K 7/16* (2006.01)
*A61Q 11/00* (2006.01)

(52) U.S. Cl. .................. 426/805; 426/89; 426/132; 119/710

(58) Field of Classification Search .............. 426/132, 426/805, 89; 119/710
See application file for complete search history.

(56) References Cited

U.S. PATENT DOCUMENTS

| | | | |
|---|---|---|---|
| 2,677,700 A | 5/1954 | Jackson et al. | |
| 3,266,921 A * | 8/1966 | Abere | 106/243 |
| 3,639,563 A | 2/1972 | Januszewski | 424/49 |
| 3,871,334 A * | 3/1975 | Axelrod | 119/710 |
| 3,882,257 A | 5/1975 | Cagle | 426/274 |
| 3,947,570 A | 3/1976 | Pensak et al. | 424/54 |
| 4,130,636 A | 12/1978 | Tomlinson | 424/52 |
| 4,145,447 A | 3/1979 | Fisher et al. | 426/72 |
| 4,260,635 A | 4/1981 | Fisher | 426/3 |
| 4,343,785 A | 8/1982 | Schmolka | 424/49 |
| 4,364,925 A | 12/1982 | Fisher | 424/50 |
| 4,465,663 A | 8/1984 | Schmolka | 424/62 |
| 4,476,107 A | 10/1984 | Schmolka | 424/49 |
| 4,511,563 A | 4/1985 | Schmolka | 514/162 |
| 4,546,001 A | 10/1985 | Gellman et al. | 426/549 |
| 4,674,444 A | 6/1987 | Axelrod | 119/29.5 |
| 4,702,929 A | 10/1987 | Lehn et al. | 426/635 |
| 4,771,733 A | 9/1988 | Axelrod | 119/29.5 |
| 4,868,002 A | 9/1989 | Scaglione et al. | 426/641 |
| 4,950,479 A | 8/1990 | Hill et al. | 424/49 |
| 5,009,973 A | 4/1991 | Yoshida et al. | 430/45 |
| 5,011,679 A | 4/1991 | Spanier et al. | 424/57 |
| 5,015,485 A | 5/1991 | Scaglione et al. | 426/94 |
| 5,026,572 A | 6/1991 | Neiberger | 426/641 |
| 5,032,387 A | 7/1991 | Hill et al. | 424/49 |
| 5,047,231 A * | 9/1991 | Spanier et al. | 424/57 |
| 5,057,309 A | 10/1991 | Hill et al. | 424/52 |
| 5,094,870 A | 3/1992 | Scaglione et al. | 426/549 |
| 5,100,651 A | 3/1992 | Boyer | 424/52 |
| 5,114,704 A * | 5/1992 | Spanier et al. | 424/57 |
| 5,149,550 A | 9/1992 | Mohilef | 426/3 |
| 5,200,212 A | 4/1993 | Axelrod | 426/2 |
| 5,215,038 A | 6/1993 | O'Rourke | 119/29 |
| 5,240,720 A | 8/1993 | Axelrod | 426/2 |
| 5,290,584 A | 3/1994 | Ray | 426/637 |
| 5,296,209 A | 3/1994 | Simone et al. | 424/49 |
| 5,296,217 A | 3/1994 | Stookey | 424/57 |
| 5,310,541 A | 5/1994 | Montgomery | 424/50 |
| 5,329,881 A | 7/1994 | O'Rourke | 119/710 |
| 5,339,771 A | 8/1994 | Axelrod | 119/710 |
| 5,407,661 A * | 4/1995 | Simone et al. | 424/49 |
| 5,431,927 A | 7/1995 | Hand et al. | 426/2 |
| 5,467,741 A | 11/1995 | O'Rourke | 119/710 |
| 5,476,069 A * | 12/1995 | Axelrod | 119/709 |
| 5,485,809 A * | 1/1996 | Carroll | 119/710 |
| 5,538,667 A | 7/1996 | Hill et al. | 252/312 |
| 5,578,373 A | 11/1996 | Kobayashi et al. | 428/364 |
| 5,609,913 A | 3/1997 | Welch | 427/242 |
| 5,618,518 A * | 4/1997 | Stookey | 424/57 |
| 5,635,237 A | 6/1997 | Greenberg et al. | 426/646 |
| 5,651,959 A | 7/1997 | Hill et al. | 424/49 |
| 5,673,653 A | 10/1997 | Sherrill | 119/709 |
| 5,711,936 A | 1/1998 | Hill et al. | 424/49 |
| 5,827,565 A | 10/1998 | Axelrod | 426/623 |
| 5,904,614 A | 5/1999 | King | 451/386 |
| 5,908,614 A | 6/1999 | Montgomery | 424/53 |
| 5,944,516 A | 8/1999 | Deshaies | 433/1 |
| 5,989,604 A | 11/1999 | Wolf et al. | 426/103 |
| 6,074,662 A | 6/2000 | Montgomery | 424/442 |
| 6,165,474 A * | 12/2000 | Frudakis et al. | 424/737 |
| 6,223,693 B1 * | 5/2001 | Perlberg et al. | 119/707 |
| 6,238,715 B1 | 5/2001 | Baikie | 426/92 |
| 6,277,420 B1 | 8/2001 | Andersen et al. | 426/92 |
| 6,350,438 B1 | 2/2002 | Witt et al. | 424/53 |
| 6,365,133 B1 * | 4/2002 | Rich | 424/49 |
| 6,444,243 B1 * | 9/2002 | Duensing et al. | 426/132 |
| 6,506,401 B1 * | 1/2003 | Rothamel et al. | 424/439 |
| 6,682,722 B1 * | 1/2004 | Majeti et al. | 424/53 |

(Continued)

OTHER PUBLICATIONS

Socransky, S.; Haffajee, A. J. Periodontol., "The Bacterial Etiology of Destructive Periodontal Disease: Current Concepts" 63:322-331, (1992).

(Continued)

*Primary Examiner*—Milton I. Cano
*Assistant Examiner*—Adepeju O. Pearse

(57) ABSTRACT

A wide range of aqueous based soaking operations can be employed to impregnate substantially throughout various rawhide pet chews; suitable substances for release into the oral cavity of pets during chewing include emulsions, surfactants, conditioners, flavorants and/or active ingredients. Prior to impregnation, the rawhide chews are physically disrupted/penetrated to augment substance impregnation substantially throughout the chews.

18 Claims, 2 Drawing Sheets

U.S. PATENT DOCUMENTS

| | | | |
|---|---|---|---|
| 2002/0081267 A1* | 6/2002 | Barabolak et al. | 424/48 |
| 2003/0106500 A1* | 6/2003 | Kirch | 119/710 |
| 2004/0131732 A1* | 7/2004 | Axelrod et al. | 426/132 |
| 2004/0137117 A1* | 7/2004 | Axelrod | 426/132 |
| 2004/0241293 A1* | 12/2004 | Isern et al. | 426/132 |

OTHER PUBLICATIONS

Moore, W., Moore, L., Periodontol. 2000, "The Bacteria of Periodontal Diseases" 5:66-77, (1994).

Rerchart P.A., J. Periodont. Res., "Periodontal Disease in the Domestic Cat" 19:67-75 (1984).

Socransky, S.S., Haffajee, A.D., Periodontol. 2000, Evidence of Bacterial Etiology: A Historical Perspective 5:7-25, (1994).

Davies, D.G., Parsek M.R., Science, "The Involvement of Cell to Cell Signals in the Development of a Bacterial Biofilm" 280:295-298, (1998).

Churchill, James E., "The Complete Book of Tanning Skins and Furs", (1983), pp. 165-166.

Chemical Technology: An Encyclopedic Treatment, vol. V, Barnes & Noble Books, (1972), pp. 392-406.

Davey and O'Toole, "Microbial Biofilms: From Ecology to Molecular Genetics" Microbiol. Mol. Biol. Rey. 64:847-867 (2000).

Harvey C.E., Textbook of Small Animal Surgery, W.B. Saunders, Phila, PA (1985), pp. 615-620.

Lage, et. al., U. Am. Veterinary Medical Association., "Effect of Chewing Rawhide and Cereal Biscuit on Removal of Dental Calculus in Dogs" 197, pp. 213-219 (1990).

Wilson, M., Oral Microbiol. Immunol., "Susceptibility of Biofilms of *Streptococcus sanguis* to Chlorhexidine Gluconate and Cetylpyridinium Chloride" 11:188-192, (1996).

Kolenbrander, P.E., Methods Enzymol, "Coaggregations Among Oral Bacteria" 253:385-397, (1995).

Harvey E. E., et al., Textbook of Veterinary Internal Medicine, "Oral, Dental, Pharyngeal, and Salivary Gland Disorders" W.B. Saunders, Philadelphia, PA (1982), pp. 1126-1187.

Harvey, C.E., Veterinary Dentistry, W. B. Saunders, Oral Medicine, Phila PA (1985), pp. 34-66, 199.

Whittaker, C.J., Klier C.M., Kolenbrander, P.E., Annu. Rev. Microbiol., Mechanisms of Adhesion by Oral Bacteria 50:513-552, (1996).

Grander, S., J. Antimicrob. Chemother., "Bacterial Biofilms: Resistance to Antimicrobial Agents" 37:1047-1050, (1996).

Eisenmenger, E. Zetner C., Veterinary Dentistry, "Periodontal Diseases" Lea & Febiger, Phila, PA (1985) pp. 131-150.

Chen, C. Journal of the California Dental Association, :Periodontis as a Biofilm Infection pp. 1-14, 2001.

Arnold, John R., Hides and Skins, pp. 6, 7, 252, 253, 310 & 311, 1925.

Kolenbrander, P.E., J. Applied Bacteriol., "Coaggregation of human oral bacteria: potential role in the accretion of dental plaque", 78:79S-86S, 1993.

Kyle, M.A., J.V.D. "Canine periodontal disease—clinical examination and diagnosis", vol. 5 no. 2, 1988.

Encyclopedia of Chemical Technology, "Leather", 3$^{rd}$ Ed., vol. 14, pp. 200-216, 1981.

Papapanou, "Periodontal Diseases: Epidemiology", Annu. Periodontol., 1: 1-36, 1996.

Eisner, "Treating the early stages of periodontal disease", Veterinary Medicine, 698-708, 1989.

Eisner, "Periodontal disease in pets: The pathogenesis of a preventable problem", Veterinary Medicine, 97-104, 1989.

Studer, "SAC, the role of dry foods in maintaining healthy teeth and gums in the cat", Veterinary Medicine/Small Animal Clinician, 1124-1128, 1973.

Bentz, "Improving Your Cat's Health with Home Dental Care", Cats Magazine, 16-18, 1987.

North American Packer Hides, Pratt Bros. Co., p. 107, 1939.

Zambon, J. "Periodontal Diseases: Microbial Factors", Ann. Periodontal, 1: 879-925, 1996.

Flemming, Louis, A., Practical Tanning pp. 81-83, 1910.

Frost, "Feline Dental Disease", Vet. Clin. N. Amer., 16(5), 851-874, 1986.

* cited by examiner

Fibrillated slits

Closely spaced needle punctures

Widely spaced needle punctures alternating

Drilled holes

Punched holes with varying diameters
creating a branded pattern

EMULSION IMPREGNATED RAWHIDE CHEWS

FIELD OF THE INVENTION

The present invention is directed to emulsion, surfactant, flavorant, conditioner and/or active ingredient impregnated rawhide pet chews suitable for encouraging pets to control biofilms and the fetid breath associated with biofilms. As these impregnated rawhide pet chews are chewed, they physically remove and disrupt biofilms while simultaneously releasing substantive biofilm disrupting substances and/or flavorants throughout the oral cavity of the pet. These rawhide chews are physically disrupted/penetrated in order to augment substance impregnation substantially throughout the chew.

BACKGROUND OF THE INVENTION

Unlike humans, pets do not chew and thoroughly masticate their food before swallowing. Because most of their teeth are sectorial in design (i.e., built for tearing and shredding meat from a carcass and not grinding), pets do not have serious problems with caries. That is, due to limited masticating, pets generally do not pack food and debris between their teeth like humans do. However, pets are domesticated carnivores, taken out of the wild. Accordingly, they no longer have the opportunity to regularly rip, tear and/or shred meat from the carcass of their prey. This lack of "carnivore-type" chewing activity renders most domesticated pets vulnerable to gum disease.

Unfortunately, like their civilized owners, domesticated pets generally suffer from gum disease at about the same incidence as adult humans. For example, more than 86% of the dogs and cats older than four years of age that are brought to veterinary clinics have periodontal disease. See Colmery B., Front R., Vet. Clin. N America, 18:891 (1982).

Periodontal disease is the overwhelming reason for tooth loss in dogs. Unfortunately, in most cases, treatment for periodontal disease must continue for the life of the pet, because of the pet's continued susceptibility and the chronicity of the disease. Groe T. K., *The Compendium on Continuing Education*, Vol. 564, No. 7, June 1982.

Periodontal disease in the domestic cat was studied by Rerchart PA et al., and reported in *J Periodont. Res.*, 19:67 (1984). Periodontal disease is the most common dental disease in cats. J.V.D., Vol. 5, No. 2, June 1988, and is the most prevalent disease condition found in cats today, *Cats Magazine*, 16–18, January 1987.

Periodontal problems are progressive. The first occurrence is the formation of plaque (more accurately described as biofilm), which is a transparent, adhesive fluid composed of the mucin in saliva, food particles, sloughed epithelial cells from the abrasive process of eating and the mouth's resident bacteria (usually aerobic Gram-positive, nonmotile cocci). The adhesive matrix that contains the bacteria is called the pellicle.

Soft plaque can be removed from teeth by the mechanical action of brushing. If plaque is not removed, the mineral salts in the saliva, particularly calcium carbonate, will precipitate into the plaque forming hard dental calculus (tartar). Eventually, this hard, rough-surfaced tartar is irritating to the tissue wall of the gingival sulcus. This irritation inflames the soft tissues. Specifically, tartar can be defined as an incrustation of the teeth consisting of salivary secretion, food residue and various salts, such as calcium carbonate or phosphate.

When tartar or plaque (biofilm) collects on the teeth, it creates pressure on the gums causing them to become inflamed and to recede. Affected gums appear reddish-blue in color and bleed easily. Teeth in neglected pets may become loose. At this state, pus can be expressed from the surface of the gums when mild pressure is applied. Stoder E. and Stapley R. D., *Veterinary Medicine/Small Animal Clinician*, 1124, October 1973.

The organisms present in inflamed gum tissue are usually anaerobic, Gram-negative, motile bacilli. See: Eisner E. R., *Veterinary Medicine*, 97–104, January 1989, Frost R., Williams C. A., *Vet. Clin. N. Amer.*, 16(5):851–874 (1986); Harvey E. E. et al., *Textbook of Veterinary Internal Medicine*, W. B. Saunders, Philadelphia, Pa. (1982), pp. 1126–1187. Harvey C. E., *Veterinary Dentistry*, W. B. Saunders, Phila Pa. (1985), pp. 34–66, 956–199. Ross D. L., *Current Veterinary Therapy*, VI, W. B. Saunders. Phila Pa. (1977), pp. 918–921; Eisenmenger, E. Zetner C., *Veterinary Dentistry*, Lea & Febiger, Phila, Pa. (1985) pp. 131–150; Harvey C. E., *Textbook of Small Animal Surgery*, W. B. Saunders, Philadelphia, Pa. (1985), pp. 615–620. The depth of the gingival sulcus in dogs suffering from gum disease extends from a normal condition of 1–2 mm in depth to an abnormal condition of 3–4 mm in depth, or greater. The detachment of the gingiva and the formation of periodontal pockets begins at this depth of the gingival sulcus.

Of the several signs of periodontal disease readily evident to the examining veterinarian as well as the owner, the most common presenting sign is "halitosis", i.e., "fetid breath". Kyle M. A., *.J.V.D.* Vol. 5, No. 2, June 1988. This bad breath is a byproduct of the infection in the mouth. Pain due to the bacterial toxins produced accompanies this condition. If the oral pain is severe enough, irritability and improper eating habits generally develop. Eisner E. R., *Veterinary Medicine*, 97–104, January 1989.

Biofilm formation in pets is an extremely complex process. Almost immediately after removal of bacteria from the tooth surface by prophylaxis, a ubiquitous layer of dental pellicle is formed on tooth surfaces. The early bacterial colonizers, mostly facultative gram-positive *Streptococci* and *Actinomyces* species, adhere to the dental pellicles on the tooth surface. Following the adherence of early colonizers, the biofilm increases its cell numbers mainly by bacterial growth.

The microbial composition of biofilms gradually becomes more diversified, and after two to three weeks, the biofilm becomes a mature bacterial community. During biofilm development, various types of bacterial adhesives mediate the attachment of the bacteria to receptors in dental pellicles or on the surface of other bacteria. See Davey and O'Toole, "Microbial biofilms: from ecology to molecular genetics" *Microbiol. Mol. Biol. Rev.* 64:847–67 (2000).

Periodontitis can be prevented by keeping the pet's teeth clear of plaque and tartar buildup (biofilm), by regular cleansing of the teeth and gums or by periodic mechanical removal of tartar and/or plaque by an oral care professional. Studer E., Stapley R. D., Veterinary Medicine Small Animal Clinician, 1124, October 1983.

According to Eisner E. R., "Basic home care consisting of regular brushing to maintain healthy teeth and gums is the cornerstone of treatment for periodontal disease in pets." *Veterinary Medicine*, 698–708, July 1989.

Unfortunately, dental hygiene in pets is something that most owners neglect. Many pet owners are unaware that just like people, pets require regular dental care. Most pet treat manufacturers have attempted at one time or another to incorporate various oral hygiene benefits in their pet care products. To date, these oral care adjuncts to pet food, chews, treats, etc., have not proven too successful, as the previously referenced survey of oral hygiene of pets older than four years of age brought to veterinary clinics indicates.

Various rawhide chew toys have been the primary focus for attempting to remove and/or control biofilms in pets.

Rawhide is a byproduct of the slaughter of hoofed animals and consists of the hide, tendons, etc, of the animal. Rawhide contains about 65–70% water, 30–35% dry material and less than 1% ash. The dry material is largely made up of fibrous proteins, collagen, keratin, elastin and reticulin. Due to this high water content, previously known methods of processing rawhide required that the rawhide be dried before it is used to produce pet chews. For a detailed description of rawhide, see:

*Chemical Technology: An Encyclopedic Treatment*, Vol. V, Barnes & Noble Books, (1972) Pages 392 to 406, is a general disclosure of types of leathers and their uses, and the tanning of leather. Arnold, John R., *Hides and Skins*, (1925), pages 6, 7, 252, 253, 310 and 311, is a general disclosure on raw and tanned hides and skins.

*Footwear And Leather Abstracts. Information Retrieval Limited*, Vol. II, No. 1, (1967), page 61, discloses several methods for the depilation of skins and raw hides and for processing raw hide.

*North American Packer Hides*, Pratt Bros. Co., (1939), page 107, defines rawhide leather as being hides that have been limed, dehaired and stuffed with oil or grease, but otherwise not tanned. Flemming, Louis, A., *Practical Tanning*, (1910), pages 81 to 83, describes methods of making leather.

Churchill, James E., "*The Complete Book of Tanning Skins And Furs*", (1983), page 165, discloses how to make raw hide. Page 166 discloses that rawhide and objects made from rawhide will be eaten by dogs and other animals unless they are treated with mineral oil or another preservative.

Partridge, John, "*Chemical Treatment of Hides And Leather*", (1972), pages 2 to 43, deals with the chemical preservation of raw hides and skins and the chemical dehairing of skins and hides.

The treatments include: removing hair using a solution of lime containing an inorganic phospho-sulfur compound containing at least one P-S bond; and dehairing using enzymatic action with $K_2HPO_4$ as a pH adjuster.

Thorstensen, Thomas C., *Practical Leather Technology*, (1985), pages 1 to 41, deals with the preparation of hides.

Kirk-Othmer, *Encyclopedia of Chemical Technology*, $3^{rd}$ Ed., Vol. 14, (1981), pages 200 to 216, is a general article on leather. Pages 213, 215 and 216 disclose that polyphosphates are excellent pretannages for vegetable tanning. Optimum molecular weights of the polyphosphates are from 1500 to 2500. Also there is a minimum-effluent vegetable tanning system, known as the Liritan process. The limed and bated hides are treated for 24 hours in a pit with 5 percent of sodium hexametaphosphate (Calgon) solution and sufficient sulfuric acid to achieve a pH of 2.8 at the end of that time. This part of the process has become known as the Calgon pickle. The solution is reused daily, being regenerated with additional sodium hexametaphosphate and sulfuric acid, and is discarded only once a year. The treatment presumably prepares the hides for a more rapid vegetable tanning process, and the recommended one with varied concentration of wattle (mimosa) takes 11 days. The tanning liquors are recirculated and reused. Further finishing of leathers that have been prepared by the Liritan combination tannage process, as a non-effluent rapid tannage for sole leather, is used by sole-leather tanneries throughout the world.

Early methods of manufacturing pet chews out of substantially pure rawhide were as simple as preparing and drying rawhide strips until they were hard and bonelike. These nonmechanical methods consist of preparing the rawhide by removing, either chemically or otherwise, the fat and hair found in the cattle ligaments and other material which comprise the raw starting material. The treated rawhide is then split, cut and rolled into the desired shape, such as a rope or strip, and dried. Coloring, flavor additives and antitartar ingredients are applied to surfaces of the chew by coating or basting the outside of the rawhide strip once dry.

One of the simpler methods requires drying the cut rawhide in the sun, before the rolling step, in order to preserve the rawhide. Prior to the rolling process, the dried rawhide is dipped in water, making it soft and easier to roll. The rawhide therefore needs very little drying once rolled. However, this drying process results in yellow or brown bones which are generally unappealing to pet owners.

Another nonmechanical method consists of working with the rawhide in the wet state, possibly wringing the rawhide out before processing. Under this process, the rawhide is cut and rolled in the wet state.

The nonmechanical "clean, cut and dry" methods of producing pet chews are labor and energy intensive and time consuming. The methods are labor intensive because the treated skins are sorted depending on their size, laid out, cut into big strips, distributed to the workers who roll them into bones, placed on trays, shipped to the ovens and usually turned over once a day until dry. There are also problems with quality control. Because of all the manual work involved, the percentage of "seconds" and rejects is unreasonably high, compared to machine made products.

These methods are energy intensive because the rawhide has to be dried slowly once rolled to obtain a hard (15% moisture content) product. Slow drying is necessary because of the risk of cooking the rolled product into gelatin. Typically the drying process can last up to 15–20 days, starting off with a very low temperature (approximately 50° C.) and gradually reaching 80° C. The drying can involve electric fans and wood heated air, running 24 hours a day.

In one preferred method of making rawhide products in accordance with the present invention, cowhides are split and thoroughly washed and cleaned of bacteria. The hide is treated and processed in the same manner as for conventional rawhide chew toys, with materials such as detergents, water and anti-hair materials. The washed hides are then sanitized, such as by being tumbled in liquid hydrogen peroxide and then thoroughly rinsed with water. Excess water is then removed, such as by pressing the hides between the nip of two pinch rollers. At this point, the hides are relatively soft and flexible, but may contain as much as 75% absorbed water. These hides are then ready for physical disruption/penetration to be followed by soaking.

Illustrative of a nonmechanical method for manufacturing rawhide chews is U.S. Pat. No. 5,149,550 to Mohilef (1992), which teaches the manufacture of pet chews by (1) washing ligaments from cattle and other hoofstock in an aqueous degreasing solution or roasting, thereby rendering the ligaments substantially free of fat, and (ii) drying until hard.

U.S. Pat. No. 5,047,231 to Spanier et al., (1991) discloses a process for preparing rawhide by adding an inorganic pyrophosphate compound to rawhide strips and then drying the rawhide. The resultant pyrophosphate coated product, when chewed by the dog, reportedly results in reduced tartar accumulation on the dog's teeth.

In an effort to address the problem of choking and intestinal blockage associated with bulk rawhide, pet chew products have been developed utilizing rawhide that has been chopped, sliced, shredded, ground, pulverized or otherwise comminuted. The comminuted pieces are then wetted, optionally fortified with adhesives, resins, etc., and finally compacted or compression molded. Although the removal of a significant portion of the water during the molding process enhances the resulting product's integrity, the compression molding process nonetheless has its limits with regard to the ultimate strength characteristics of the final product. Limiting the moldings to relatively small sizes also serves to yield a stronger product, although peeling or delaminating is still a problem. While the disassociated particles tend to be of a physically small size and are therefore able to pass harmlessly through the dog's intestinal tract, ingestion thereof can nonetheless cause problems.

An additional approach has been employed in the past wherein comminuted rawhide, in combination with a variety of additives, is first compression molded and then baked. While the baking step has a sterilizing effect and thereby addresses the decay problem described above, the end product tends to be extremely hard and dense, and is therefore not particularly "chewable." Moreover, due to its brittleness, it is quickly and easily shattered by a large dog, and consequently is quickly consumed.

In the course of subjecting the rawhide to melting temperatures during the injection molding process, the material becomes sterilized. This serves to interrupt any decaying process that may be in progress, and thereby alleviates the foul odor normally associated with rawhide chew toys. Furthermore, sterilization is achieved without baking the molded material so as to yield a very chewable product with a consistency and texture preferred by most dogs. By injection molding a molten medium, a substantially more cohesive product is formed than is possible using compression or compaction molding techniques.

PRIOR ART

The prior art teaches there is a need to make periodic, frequent cleansing of the teeth of dogs while controlling biofilms easier and more conveniently for the pet owner, so that cleansing and biofilm control are more regularly and frequently performed by the pet owner. To date, this need remains substantially unmet.

A number of pet chew products have been developed over a long period of time in an attempt to address this long-felt need For example, U.S. Pat. No. 3,882,257 to Cagle describes a pet food product in which a slurry is dehydrated and made into a simulated bone for dogs which can help exercise the jaws and gums and help to remove tartar from the teeth. U.S. Pat. No. 4,145,447 to Fisher et al., discloses an animal food which is chew resistant and can help remove plaque or tartar from animal teeth. Still another product of this type is disclosed in U.S. Pat. No. 5,094,870 to Scaglione et al., which discloses a process for preparing dog biscuits containing at least one inorganic phosphate salt. The dog biscuits are (hopefully) chewed and/or eaten by the dog with the result that tartar accumulations on its teeth are reduced or prevented. U.S. Pat Nos. 5,296,209 and 5,407,661, both to Simone et al., describe a pet chew product having a flexible cellular matrix in which is contained a cellulose fibrous material such as corn cob fractions having a mechanical cleansing function, which, when chewed by the pet, is intended to effect a reduction in plaque, stain and tartar on the pet's teeth. While the foregoing approaches may be meritorious, they involve creating a unique food product (as distinguished from a "chew toy"), which is a relatively complex and expensive approach, and there is no guarantee that the resultant product will be accepted and actively consumed by dogs.

U.S. Pat. No. 5,100,651 to Boyer discloses a health product for the care of teeth of dogs, capable of being chewed or gnawed by the dogs, which contains fluoride, antimicrobial agents, and anti-decay agents.

U.S. Pat. No. 5,296,217 to Stookey discloses a method for preventing dental calculus using sequestering agents applied to commercially prepared diets of domestic animals. The sequestering agents form soluble calculus complexes in saliva and dental plaque, thereby preventing the calcifying dental plaques. Sodium hexametaphosphate has been utilized as a preferred sequestering agent. These sequestering agents can be added to dog treats, i.e., biscuits, and/or to the surface of chew toys such as rawhide.

U.S. Pat. No. 5,310,541 to Montgomery describes an animal chew product containing one or more enzymes and substrates for the purpose of generating antimicrobial compounds upon contact with animal saliva, for tartar prevention.

U.S. Pat. No. 5,431,927 to Hand et al., describes a pet food prepared from a fiber containing nutritionally balanced mixture of carbohydrates, protein, fat, vitamins and minerals. The product has an expanded striated structure matrix which fractures when chewed by a pet, creating a mechanical tooth cleansing function which acts to reduce plaque, stains and tartar on the pet's teeth.

U.S. Pat. No. 5,467,741 to O'Rourke discloses a chew toy for dogs which is molded from soft pliable threads twisted about one or more strands of twisted synthetic fibers. The twisted fibers are impregnated with one ore more breath freshening or flavoring agents so as to dispense the agent as the dog chews.

U.S. Pat. No. 5,618,518 to Stookey discloses a chew product containing sodium hexametaphosphate, which is useful against the buildup of dental calculus.

U.S. Pat. No.5,904,614 to Cyr et al., discloses a food dog bone made of 93% casein, poultry meal, and gelatin, and 7% of an anti-tartar composition used in the control of tartar in domestic animals such as dogs.

U.S. Pat. No. 5,908,614 to Montgomery describes a peroxidase-activating oral care composition including an enzymatic water soluble hydrogen peroxide precursor and pH adjusting agent. The composition facilitates the rapid release of hydrogen peroxide and results in the activation of a peroxidase enzyme in an oral cavity.

U.S. Pat. No. 5,944,516 to Deshaies discloses a device for cleaning the teeth of a dog, consisting of brushes, onto which toothpaste is automatically dispensed during a brushing procedure.

U.S. Pat. No. 5,989,604 to Wolf et al., discloses a pet foodstuff and treatment method for reducing the incidence of dental caries in non-human animals. Xylitol containing foodstuff is used.

Early pet food jerky that was made by dehydrating low fat beef muscle tissue was highly palatable and could provide a reasonable "chew life" if sliced and dried in thick strips. Attempts have been made to toughen reformed jerky products to improve the "chew life". Neilberger (U.S. Pat. No. 5,026,572) disclosed a multiple extrusion method of producing jerky by extruding a blend of wet beef and flour and then incorporating the cooked product of this first extrusion into a second extrusion step. Ray (U.S. Pat. No. 5,290,584) teaches the utilization of frozen mechanically separated meats that are comminuted to a small particle size and then mixed with pregelatinized flour prior to elevated temperature extrusion. Scaglione (U.S. Pat. No. 4,868,002) describes a process for making a tougher jerky using fibrous components of animal tissue or plant tissue such as wheat straw, alginates or industrial generated fibers.

Many long lasting synthetic chews have been developed in attempts to address the "chew life" issue. Axelrod (U.S. Pat. No. 4,771,733) discloses a method whereby an aqueous based flavor or odor is incorporated into a polyurethane resin based dog chew to improve the palatability of the product. Axelrod attempted further improvements to this technology (U.S. Pat. No. 5,339,771) by dispersing an animal meal within the matrix of a synthetic thermoplastic molded bone. Axelrod also discloses (U.S. Pat. No. 5,240,720) an injection molded chew produced from rennet casein and gelatin which can be heated by the consumer in a microwave oven to cause the chew to expand and thereby render it more easily chewable.

It is known in the art to apply a coating on rawhide chews by using a baste. Conventional baste may be used to provide desired coloring and/or flavoring or odor to make the chew toy more appealing to pets and their owners. Particular baste formulations can provide a more natural-looking color that pet owners are more inclined to purchase. For example, U.S. Pat. No. 5,673,653, issued to Sherrill on Oct. 7, 1997 (Sherrill), col. 1, lines 55–65, discloses various types of bastes applied to rawhide chew toys.

Other Patent references of interest include: U.S. Pat. Nos. 6,350,438; 5,114,704; 5,011,679; 4,260,635; 4,702,929; 5,609,913; 5,673,653; 5,827,565; 4,674,444; 5,100,651; 4,546,001; 4,364,925; 5,200,212; 6,365,133; 5,476,069; 5,635,237: 5,215,038; 5,329,881 and 5,467,741.

The effect of chewing rawhide "chips" (Chew-eez®, Superior Brands, Inc.), was compared with a leading cereal biscuit (Milk Bone®), Nabisco Brands, Inc.) on the removal of calculus in dogs reported in *Jayma*, Vol. 197, No. 2, Jul. 15, 1990, to with:" . . . rawhide removed calculus considerably better than cereal biscuits for the study period." In U.S. Pats. No. 5,009,973 and U.S. Pat. No. 5,015,485 assigned to Nabisco Brands, Inc., cereal biscuits (similar to Milk Bone®) containing pyrophosphate were reported to prevent tartar accumulation on the teeth of dogs. However, the chewing and eating of 12 such biscuits a day was required by a small dog to achieve the effect reported. This comprises 25 to 33% of the small dog's daily caloric requirement.

The act of regularly chewing an object (such as rawhide) sufficiently rigid to allow for an oral residence time of greater than thirty seconds or so has been shown to result in reduced tartar accumulation compared to a quickly consumable object, such as a biscuit (Lags et al., J. *Am. Veterinary Medical Association.*, 197, pp. 213–219 (1990).

Particularly relevant additional U.S. Patents include: U.S. Pat. Nos. 6,074,662; 6,223,693; 6,277,420; 6,238,715; 6,350,438; 6,165,474; 5,047,231; 6,365,133; 6,159,508; 6,309,676; 5,635,237; 5,114,704; 5,011,679; and 6,365,133.

Chew toys for dogs perform several important functions. First, and most importantly, these toys facilitate several health functions, such as teeth and gum cleaning, gum massage and chewing exercise. Benefits of these functions include the prevention of periodontal disease and tartar buildup, as well as the promotion of healthy teeth and jaw development. Dogs often do not have access to natural bones and hard objects that scour their teeth when chewed and assist in healthy dental development, and owners must sometimes look to toys or snacks in order to fill this void. A variety of artificial chew toys have been created in an attempt to achieve these health benefits, with varying degrees of success. For instance, artificial chew toys have been made from rawhide, woven fibers, and ropes. However, these materials are often rapidly destroyed by the chewing action which breaks down the fibers and structure of the material, and the soft nature of these products cannot provide the same degree and variety of health benefits that can be obtained from chew toys that are comprised of harder material.

Another important function of chew toys is to divert destructive chewing behavior and to provide amusement and entertainment for the animal. Chew toys can provide an outlet for the animal to expend its chewing energies which might otherwise be directed in a destructive manner on household objects. The degree of acceptability of the toy by the animal will determine the effectiveness and success of the product in this regard. Additionally, the toy should have an appeal to the animal and offer a means of entertainment and amusement to keep the dog happy over time, preferably over long periods of time. Therefore, it should be appreciated that there exists a need for an improved chew toy that will generate a longer period of sustained interest by dogs, thereby imparting needed health and entertainment for the animal.

Rawhide pet chews are a preferred means for cleaning tooth surfaces and fighting biofilm formation in pets. Depending on their shape and size, rawhide pet chews are generally chewed for extended periods, while effectively controlling, removing, disrupting and/or weakening biofilms through the normal physical/cleaning actions associated with the rawhide mastication process, referred to hereinafter as "physical/cleaning-type action".

Such chew products typically have a useful life (referred to hereinafter as "chew life") of several minutes to several hours. This "chew life", in addition to providing cleaning-type action, provides an ideal means for continually transferring biofilm disrupting ingredients contained throughout the rawhide to the teeth and gums of the pet as taught and claimed by the present invention.

To date, therapeutic rawhide pet chews, where the therapeutic agent is added to the surface of the rawhide, have had, at best, marginal success in contributing to rawhide's physical/cleaning/controlling, removing and/or disruption of bioflims from the teeth of pets suffering from gum disease. Additionally, such surface treatments of rawhide chews, invariably result in staining of rugs, carpeting, upholstery, etc., which has become a major "turn-off" to pet owners.

OBJECTS OF THE INVENTION

An object of the present invention is to enhance rawhide chews' performance in controlling, removing and/or disrupting biofilms in pets with corresponding improvement in "fetid" breath.

A further object of the invention is to provide rawhide pet chews impregnated throughout with emulsions, surfactants, conditioners, active ingredients and/or flavorants that are releasable during chewing over the life of the chew for the purpose of helping to control, remove and/or disrupt biofilms and fetid breath.

Another object of the invention is to enhance the palatability of rawhide chews.

Another object of the invention is to provide a range of processes for physically disrupting/penetrating and soaking rawhide pet chews in order to impregnate them substantially throughout with biofilm disrupting emulsions, surfactants, conditioners, flavorants and/or active ingredients for subsequent release over the chew life of the chew, into the oral cavity of pets.

Still another object of the invention is to provide a "self-treatment" for gum disease for pets comprising routinely providing the pet with rawhide chews impregnated substantially throughout with biofilm disrupting emulsions, surfactants, conditioners, flavorants and/or active ingredients, which are released during chewing onto the surfaces of teeth and gums.

Yet another object of the invention is to improve rawhide pet chews by impregnating substantially throughout with the substances detailed above, while simultaneously enhancing the palatability and chewability of said chews.

A further object of the invention is to provide rawhide pet chews treated with physical disruption penetration combined with impregnation throughout with various emulsions in order to help control biofilm formation in pets.

SUMMARY OF THE INVENTION

The present invention, which is distinct from and neither implied nor suggested in the prior art cited above, is directed to rawhide pet chews impregnated substantially throughout with biofilm disrupting emulsions, also contains conditioners, flavorants and/or active ingredients, which are releasable during chewing over the chew life to help control biofilm formation on the teeth of pets. These rawhide pet chews are physically disrupted/penetrated in order to augment impregnation throughout with biofilm disrupting substances. The methods of manufacturing these impregnated rawhide pet chews, and the treatment of biofilms and fetid breath in pets using these impregnated rawhide pet chews are also included in the present invention.

The emulsions, also containing conditioners, flavorants, and/or active ingredients are impregnated substantially throughout the rawhide chew irrespective of size, shape, whether the rawhide to be impregnated is fresh or has already been dried.

The emulsion, containing conditioners, flavorants and/or active ingredients are impregnated substantially throughout the rawhide chews of the present invention can be distinguished from traditional basted and/or coated rawhide pet chews described in the prior art on the basis of:

The emulsions, containing conditioners, flavorants and/or active ingredients are impregnated substantially throughout the rawhide chew and are releasable over the chew-life of the product at levels substantially greater than those available from basting and/or other surface coating processes resulting in corresponding, superior biofilm fighting.

Cleaning attributes, which are achieved over the chew-life of the impregnated rawhide product.

The plasticized effect achieved, which is attributed to emulsion Impregnation throughout the rawhide chews of the present invention resulting in an extended chew-life attributed to the intrinsic toughness associated with this increase plasticity.

Enhanced pet preference as a result of the flavor and mouth feel additives distributed substantially throughout the rawhide chew along with the emulsions, flavorants and/or active ingredients. All of these are released over the chew-life of the impregnated rawhide chew.

Enhanced texture associated with the humectants, softening agents, conditioners, etc., included in the emulsion, distributed substantially throughout the impregnated rawhide chew, which has been physically disrupted/penetrated throughout as a means of augmenting distribution of the various impregnated substances.

Enhanced overall efficacy associated with a broad range of soluble and/or dispersible active ingredients included in the soaking/impregnating process including anti-tartar, anti-gingivitis, anti-inflammatory, etc., ingredients.

Enhanced pet acceptance attributed to the chew being physically disrupted/penetrated as a means of augmenting impregnation of the various flavor, mouthfeel and conditioning substances substantially throughout the rawhide chew.

Enhanced pet owner acceptance attributed to the rawhide chew being physically disrupted/penetrated and treated with various pet friendly substances which are present via impregnating throughout the rawhide chew.

Particularly preferred emulsions for impregnating rawhide pet chews of the present invention are MICRODENT® and ULTRAMULSION®, as described in detail below.

The biofilm disrupting/controlling properties of MICRODENT® emulsions in humans has been extensively documented using chewing gums and mints as a MICRODENT® emulsion delivery vehicle. For example, reductions in plaque greater than 35% have been reported in clinical studies on chewing gums containing up to about 2% by weight MICRODENT® emulsion. Other clinical studies on MICRODENT® emulsion containing mints showed plaque reductions of about 20% with up to about 2% by weight MICRODENT® emulsion. It has been suggested that MICRODENT® emulsion impregnated rawhide pet chews of the present invention, where the MICRODENT® is distributed essentially throughout the rawhide chew, would, like chewing gum, continuously release the anti-biofilm MICRODENT® emulsion into the pet's oral cavity throughout the time the pet is chewing the impregnated rawhide chew.

The masticating of rawhide pet chews provides an excellent physical cleaning action for pet teeth, which is particularly effective in controlling newly formed biofilm, particularly when this physical cleaning is combined with the simultaneous release of the MICRODENT® emulsion which coats the entire oral cavity with this substantive, surface-energy altering emulsion, as the bio film is being disrupted by the physical cleaning action attributed to the chewing of the rawhide.

In addition to their biofilm disrupting properties, the preferred MICRODENT® and ULTRAMULSION® emulsions are particularly effective as carriers for various pet flavorants, conditioners, mouthfeel agents, etc., which tend to encourage aggressive chewing and maintain pet interest in the chew throughout the chew-life of the impregnated rawhide.

DEFINITIONS OF KEY TERMS

Figure 1:
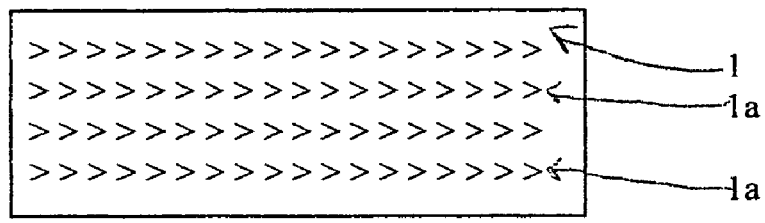
FIG. 1 illustrates rawhide penetrated by a patterned arrangement of fibrillated slits.

For the purposes of the present invention, the following key terms are defined as set out below:

"Rawhide" is defined as the byproduct of the slaughter of hoofed animals and consists of the hide, tendons, etc. The dry material is largely made up of fibrous proteins, collagen, keratin, elastin and reticulin. Rawhide products originate from the natural skins of animals. In addition to cows, animal skins, such as pig, goat and water buffalo skins can also be used. To form rawhide, a cow or other animal hide is split. The top grain is generally tanned and formed into leather products. The bottom half of the hide is generally kept in its natural "raw" state. Hides in such natural, untanned state, are generally referred to as rawhide. One common use for rawhide is the production of chemicals such as gelatin. Another important use for rawhide is the manufacture of edible chew toys for pets, such as dogs.

"Rawhide pet chew toys" are defined as consumable pet chews, which are free from bacteria, as well as dangerous substances such as formaldehyde and other preservatives which can be used to prevent the rawhide from becoming contaminated by bacteria, microbes, maggots and the like. A rawhide chew toy is also free from processing chemicals commonly used in the tanning of leather which make the leather soft. Not only are these unhealthy for a dog, but training a dog to chew on a toy which smells like leather could fool a dog into thinking that it is acceptable to chew on a shoe or leather handbag. In order to make rawhide chew toys acceptably resistant to bacterial contamination, rawhide chew toys are commonly sold in a substantially dehydrated state. An acceptably low moisture content can lead to a safe or stable water activity. Thus, if the water activity of the rawhide article is too high, there is a possibility that the chew toy will be contaminated by mold, bacteria and the like, or otherwise become unsanitary and potentially harmful for the pet. Thus, rawhide pet chew toy products contain less than about 13% moisture in order to have an acceptable water activity below about 0.75.

"Water activity" is defined by Encyclopedia of Food Science, AVI Publishing as the ratio of the vapor pressure exerted by the water contained in the product to the vapor pressure of pure water at the same temperature. The lower the water activity of a product, the less susceptible that product is to the growth of bacterial, fungal and yeast organisms. Fruits, bread and meat all have water activities above 0.95. In contrast, crackers, cereal and sugar can have a water activity as low as 0.1.

Rawhide also includes other animal parts such as ears and snouts. That is, dried ear and ear pieces consist primarily of a section of hard-firm ear cartilage with a piece of skin (rawhide) on each side. The resultant dog chew, comprised of an ear which includes two pieces of rawhide and hard cartilage sandwiched there between provides prolonged chewing time over similarly available chews manufactured solely of rawhide, resulting in consequently increased abrasive effect on the teeth surfaces. More particularly, there is provided a pet chew product comprising an inner layer of cartilage sandwiched between opposing outer layers of animal skin. The inner layer of cartilage preferably comprises a dried animal ear portion, and the outer layers of animal skin preferably comprise rawhide.

"Impregnated rawhide" is defined as physically disrupted/penetrated rawhide that has distributed substantially throughout a substance that has been introduced into the disrupted rawhide by means of soaking the rawhide in a water bath containing said substance.

"Periodontal disease" ("gum disease") is a broad term used to describe those diseases which attack the gingiva and the underlying alveolar bone supporting the pet's teeth. The disease exists in a number of species of warm blooded animals such as canines and felines, and includes a series of diseases exhibiting various syndromes which vary from each other according to the stage or situation of the disease or the age of the pet. The term is used for any inflammatory disease which initially occurs at a marginal gingiva area and may affect the alveolar bone. Periodontal disease affects the periodontium, which is the investing and supporting tissue surrounding a tooth (i.e., the periodontal ligament, the gingiva, and the alveolar bone). Two common periodontal diseases are gingivitis (inflammation of the gingiva) and periodontitis (inflammation of the periodontal ligament manifested by progressive resorption of alveolar bone, increasing mobility of the teeth, and loss of the teeth at advanced stage). Other terms used for various aspects of periodontal disease are "acute necrotizing ulcerative gingivitis" and "alveolar pyorrhea". Periodontal disease may involve one or more of the following conditions: inflammation of the gingiva, formation of periodontal pockets, bleeding and/or pus discharge from the periodontal pockets, resorption of alveolar bone, loose teeth and loss of teeth. Periodontal disease is generally considered to be caused by/associated with bacteria which are generally present in dental plaque which forms on the surface of the teeth and in the periodontal pocket. Thus, known methods for treating periodontal disease often include the use of antimicrobials and/or anti-inflammatory drugs.

"Alveolar bone resorption" is defined as the loss of osseous tissue from the specialized bony structure which supports the teeth. Such resorption has many causes including, but not limited to, natural remodeling following tooth extraction, scaling and root planing and the progression of periodontal disease.

"Biofilm (plaque)," the precursor of dental calculus/tartar, is defined as a community of bacteria embedded in exopolysaccharide that adheres to tooth surfaces and are a major source of the infections associated with gum disease in pets. The early bacterial colonizers of biofilm, which are mostly faculative gram-positive *Streptococci* and *Actinomyces* species, adhere to the dental pellicles on the tooth surface. Following the adherence of early colonizers, the biofilm increases its cell numbers mainly by bacterial growth.

"Dental calculus," or tartar as it is sometimes called, is defined as a deposit of hardened plaque (biofilm) which forms on the surfaces of the teeth at the gingival margin. Supragingival calculus appears principally in the areas near the orifices of the salivary ducts; e.g., on the lingual surfaces of the lower anterior teeth and on the buccal surfaces of the upper first and second molars, and on the distal surfaces of the posterior molars. Mature calculus consists of an inorganic portion which is largely calcium phosphate arranged in a hydroxylapatite crystal lattice structure similar to bone, enamel and dentin. An organic portion (biofilm) is also present and consists of desquamated epithelial cells, leukocytes, salivary sediment, food debris and various types of microorganisms. As the mature calculus develops, it becomes visibly white or yellowish in color unless stained or discolored by some extraneous agency. In addition to being unsightly and undesirable from an aesthetic standpoint, the mature calculus deposits are constant sources of irritation of the gingival and thereby are a contributing factor to gingivitis and other diseases of the supporting structures of the teeth, the irritation decreasing the resistance of tissues to endogenous and exogenous organisms.

"Surfactants" are defined as surface active agents suitable for ingestion. Said Surfactants have the property of being water soluble with a propensity to emulsify water-insoluble coating agents (as defined below), and to hold the coating agent in an aqueous suspension as an emulsion when the mixture is dispersed in water or saliva. Suitable surfactants, illustrative of the types of substances suitable for use in impregnated rawhide of the present invention, are further detailed below.

"Coating Agents" are defined as water insoluble or very slightly soluble substances which, when presented to the oral cavity in an emulsified state, will coat the teeth, gums and oral cavity tissue with a thin film of the coating agent. This film has several beneficial properties which are functionally described below.

"Conditioners" are defined as water-soluble substances, usually of high molecular weight, which in combination with the surfactant and coating agent condition (1) the rawhide, making it more flexible, tough and fresh cartilage-like with improved chewing properties and (2) the oral cavity, providing improved palatability by creating a mouth-feel more akin to fresh animal cartilage, bone and tissue. Suitable conditioners, illustrative of the types of substances suitable for use in impregnated rawhide of the present invention, are further detailed below.

"MICRODENT®" and "ULTRAMULSION®" are defined as hot melt emulsions of biofilm disrupting coating substances such as polydimethylsiloxane in surfactants such as nonionic poloxamer surfactants and include those emulsions described in U.S. Pat. Nos. 4,950,479; 5,032,387; 5,057,309; 5,538,667; 5,651,959 and 5,711,936. These patents are incorporated herein by reference. The clinical plaque effect obtained when certain of these combinations of surfactants and coating substances are introduced into the mouths of humans are detailed in Food & Drug Administration (FDA) Docket No. 81N-0033, OTC Volumes 210246 to 210262 and 210339 dated Jun. 17, 1991, filed in response to the FDA call-for-data as reported in the Federal Register, Sep. 19, 1990, 55 *Fed Reg.*, 38560, Vol. VI of said filing; the summary is specifically incorporated herein by reference.

"Impregnating" is defined as a means of penetrating/disrupting rawhide throughout with various substances. Impregnating can be achieved by certain substances by simply soaking the rawhide in solutions/dispersions of such substances until the substances have penetrated throughout the rawhide chew. Alternatively, in those instances where certain substances achieve minimal penetration of the rawhide substrate under various soaking conditions, the rawhide substrate is physically disrupted using various physical means to penetrate the rawhide, thereby augmenting penetration throughout the rawhide with those various substances that do not, on their own, penetrate the rawhide during various soaking procedures. To achieve "impregnating," various physical means of physically penetrating rawhide can be utilized including: punching, drilling, fibrillating, meshing, scoring, etc. In one embodiment the rawhide can be penetrated physically by contacting stretched rawhide with a rotating fibrillator device such as described in U.S. Pat. No. 5,578,373. The penetrations can be shaped into stars, bone-line shapes, etc., or remain essentially undefined. The level of penetration can be modest to high and can be random or patterned.

"Emulsion Impregnated Rawhide" is defined as rawhide penetrated substantially throughout with an emulsion. MICRODENT® and/or ULTRAMULSION® can be "impregnated" into fresh, surface disrupted rawhides by means of a marinating process, whereby the fresh hides soak in a MICRODENT® and/or ULTRAMULSION®/water mixture for extended periods at temperatures ranging from room temperature to elevated temperature. Alternatively, the MICRODENT® and/or ULTRAMULSION® can be added to dried rawhide chews, etc., by soaking the dried chews, which are physically penetrated, etc., at varying temperatures over a wide range of soaking periods. All of the foregoing "impregnating" means are detailed in the Tables and Examples set out below. The rawhide to be treated with MICRODENT® or ULTRAMULSION® can be fresh; however it is preferable to impregnate "preformed chew toys" that have already been physically disrupted and dried. In addition, comminuted rawhide generally produced from trimmings, etc., of formed rawhide toys and treats, i.e., knotted bones, is also suitable, particularly for pet chews that can be used with no adverse effect to the pet due to choking, blockage, etc.

"Comminuted rawhide" is defined as processed rawhide that is molded, pressed, shaped, etc. Comminuted rawhide includes rawhide pieces that are particularized into small sized particles which are shaped into various chews that, when the particles break off from the chew during mastication, they can be readily swallowed and passed through the dog's digestive system without blockage.

"Chew time" is defined as the duration that a pet treat can be chewed, gnawed, licked, etc., by a pet before it is consumed. Chew time defines the period for transferring therapeutic ingredients, such as biofilm disrupting emulsion, which are contained in MICRODENT® "impregnated" rawhide pet chews and released during chewing into the oral cavity to treat biofilms.

A "substantially impregnated-throughout rawhide treat" is defined as rawhide which is physically disrupted/penetrated throughout as a means of augmenting the "impregnation" throughout with emulsions, conditioners, surfactants, etc.

DETAILED DESCRIPTION OF THE PREFERRED EMBODIMENTS

Referring to FIGS. 1 through 5, various means of penetrating and types of penetrated rawhide are illustrated.

Referring to FIG. 1, fibrillated slits, 1a, penetrate rawhide, 1, in a patterned fashion, which results in high internal surface exposure for the impregnated rawhide while providing an easier to chew, substantially impregnated throughout rawhide treat.

Figure 2:
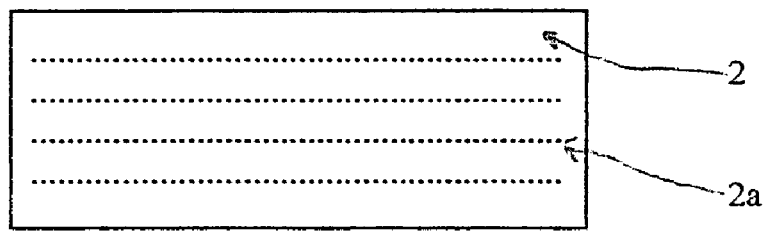
FIG. 2 illustrates rawhide penetrated by a generally closely spaced pattern of needle punctures.

Referring to FIG. 2, closely spaced needle punctures, 2a, penetrate rawhide, 2, in a closely spaced, patterned fashion, which results in a stronger, substantially impregnated throughout, rawhide treat that is stronger, but slower to impregnate.

Figure 3:
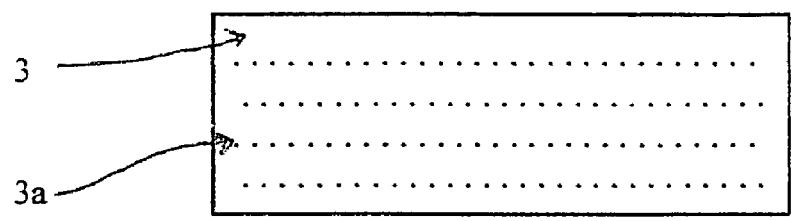
FIG. 3 illustrates rawhide penetrated by a generally widely spaced pattern of needle punctures.

Referring to FIG. 3, widely spaced needle punctures, 3a, penetrate rawhide, 3, in a widely spaced alternating pattern, which results in an impregnated rawhide treat that is much stronger, but slower to impregnate.

Figure 4:
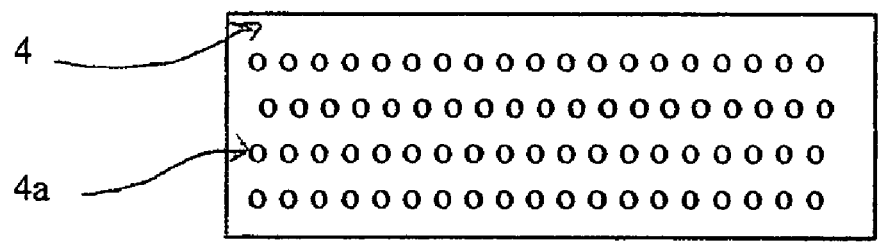
FIG. 4 illustrates rawhide penetrated by a patterned arrangement of similar sized drilled holes.

Referring to FIG. 4, similar sized, drilled holes, 4a, penetrate rawhide, 4, in a patterned arrangement, which allows for faster impregnation with high internal surface, high impregnation and an excellent visible signal.

Figure 5:
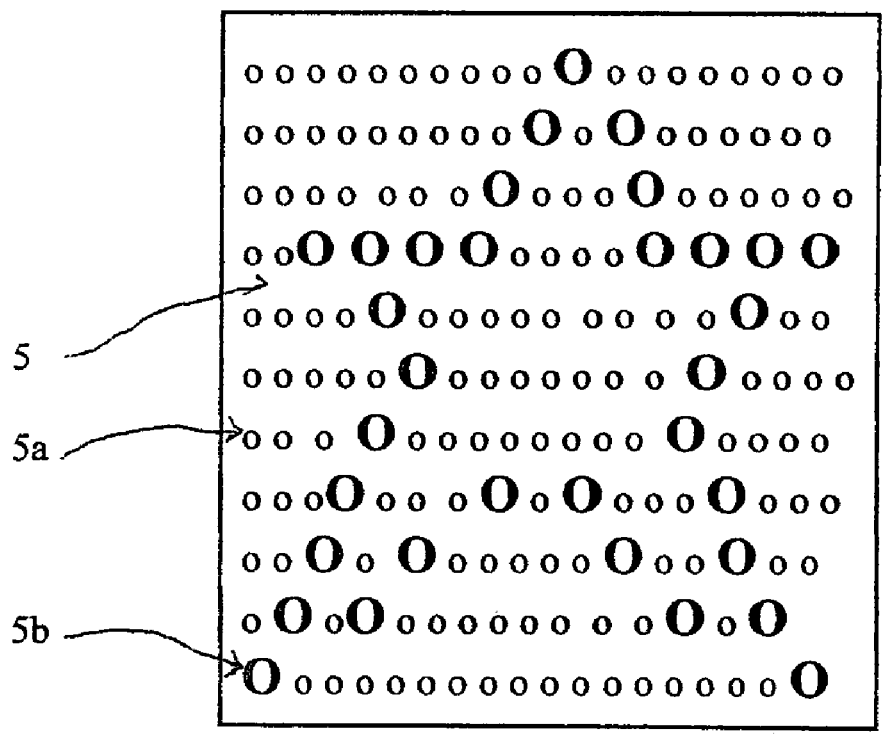
FIG. 5 illustrates rawhide penetrated by a patterned arrangement of two different sized punched holes.

Referring to FIG. 5, two different sized, punched holes, 5a and 5b, penetrate rawhide, 5, in a patterned arrangement, which provides high internal surface with excellent impregnation and a highly visible and recognizable pattern.

The extraordinary saliva flow in carnivores is substantially greater than in humans and, as a result, most therapeutic substances released from the coatings on rawhide chews during chewing or introduced via toothpaste, rinses, etc., are readily flushed by the saliva from the oral cavity usually before the therapeutic substance can have any substantial therapeutic effect in the pet's mouth.

The substantivity of the emulsions of the invention to tooth and gum surfaces plays a most critical role in effective biofilm therapy of pets. The preferred "pet applied" emulsion application is via "emulsion impregnated" rawhide chews of the present invention, where the "emulsion" is "impregnated" substantially throughout the rawhide using various rawhide physical disruption/penetration means to augment the "impregnation" with various emulsions of the invention. It has been discovered that when physically disrupted/penetrated rawhide pet chews are treated throughout with emulsions such as MICRODENT® and/or ULTRAMULSION®, surprisingly, these emulsions are consistently releasable from the chew, at biofilm disrupting levels, into the oral cavity during the chew-life of the pet treat. These emulsions also contain various other ingredients, including flavorants, conditioners, mouthfeel agents, etc., which encourage the pet to chew and help retain the pet's interest in chewing the chew.

A fundamental shortcoming with rawhide has been that basic rawhide is not particularly palatable and dogs lose interest in the product after a relatively short time. Manufacturers have attempted to overcome this by coating or basting the rawhide with flavorings, but these overcoatings are usually applied onto the surface and are quickly licked off and/or consumed by the dog, leaving a rawhide chew without basting. In addition, these surface coatings tend to soil and/or stain surfaces m the house such as carpeting, rugs, upholstery, etc.

The availability of emulsions, such as MICRODENT® and ULTRAMULSION®. "impregnated" throughout the chew and which are released from rawhide pet chews over the chew-life of the chew, allows pet owners to help control biofilms in their pets by routinely providing pets with rawhide chews impregnated throughout with MICRODENT® or ULTRAMULSION®. These emulsions contain flavorants and other ingredients that render the rawhide chew most palatable. These rawhide "impregnated emulsions" deliver plaque/biofilm fighting properties to the pet's oral cavity with minimal staining and/or soiling of surfaces throughout the household in contrast to the staining experienced heretofore with basted rawhide chews.

The melt emulsions described as MICRODENT® and ULTRAMULSION® are preferably "impregnated" substantially throughout the pet chews of the invention. These are described in detail in the MICRODENT® and ULTRAMULSION® U.S. Patents to Hill et al., referenced above. Generally, these melt emulsions comprise a coating agent emulsified in surfactants, such as:

sodium lauryl sulfate,
sodium lauryl sarcosinate,
polyethyleneglycol stearate,
polyethyleneglycol monostearate,
coconut monoglyceride sulfonates,
soap powder,
sodium alkyl sulfates,
sodium alkyl sulfoacetates,
atkyl polyglycol ether carboxylates such as those described in U.S. Pat. No. 4,130,636 polyoxyethylene derivatives of sorbitan esters, such as those described in U.S. Pat. No. 4,130,636,
polyoxyethylene derivatives of sorbitan esters, such as those described in U.S. Pat. Nos. 3,639,563 and 3,947,570,
propoxylated cetyl alcohol as described in U.S. Pat. No. 2,677,700, and
Preferred commercially available substances which include:
polyoxyethylene-polyoxypropylene block copolymers such as Pluronic F108, and F127 (BASF) and polysorbates such as Tween 40 and 80 (Hercules);
Particularly preferred surfactants include block copolymers comprising a congeneric mixture of conjugated polyoxypropylene and polyoxyethelene compounds having a hydrophobe, a polyoxypropylene polymer of at least 1200 molecular weight; such as described in U.S. Pat. Nos. 4,343,785; 4,465,663; 4,511,563 and 4,476,107.

Suitable coating substances for these melt emulsions can be functionally described as follows; they:

(1) suppress the tendency of the surfactant cleaners present to foam.
(2) are safely ingestible at the concentrations used,
(3) have an affinity for mouth and teeth surfaces,
(4) are neutral, inert and do not support biological activity,
(5) modify the surface energy properties of surfaces of the mouth such that it is more difficult for food particles, cellular debris and various plaque precursors and formers to attach to these surfaces, and
(6) form a thin, transparent, transient coating that does not build up on mouth surfaces and is removed by the normal cleaning and flushing action of the mouth.

Those coating substances suitable for the melt emulsions of the invention include various silicones, long chain hydrocarbons, CARBOWAXES® (polyethylene glycols) and polymers such as:

silicone glycol co-polymers,
polydimethyl siloxanes at viscosities up to 2.5 million cs,
long chain hydrocarbons, especially normal paraffins having a chain length of 16 carbon atoms or greater, paraffins with several loci of branching and unsaturation does not create unacceptable toxicity nor lower the solidification point below body temperature,
CARBOWAXES®(polyethylene glycols) and polymers which have limited solubility in ethanol and water solutions where the ethanol or water ratio is greater than 0.3:1 but have essentially no solubility in water or saliva at lower ratios.

Those conditioners suitable for impregnation of rawhide to improve its properties of flexibility, toughness and chewing properties are primarily selected from several classes of high molecular weight substances such as:

Purified, soluble proteins such as sodium caseinate, various cereal glutens,
albumins and the like,
Starches and modified starches,
Soluble cellulose derivative such as carboxymethylcellulose,
hydroxymethyl cellulose, and hydroxypropylcellulose,
Polyhydroxyalcohols such as hydrogenated glucose syrup,
Polyethylene and polyproplyene glycols, and
Water soluble resins such as Gantrez®.

In addition, low molecular weight polyols such as glycerin and sorbitol and other humectants may also serve as conditioners, either in combination with high molecular weight substances such as the above or alone.

Impregnating rawhide, fresh, dried and/or comminuted using surfactant/water mixtures rather than the preferred surfactant/coating emulsions fails to impart the comprehensive biofilm fighting properties attributed to the MICRODENT® and ULTRAMULSION® emulsions. However, without physical penetration augmentation, these surfactant/water mixtures do effectively penetrate and impregnate the rawhide chews imparting "plasticizing" and enhanced texturizing properties along with improved flavor attributed to the flavors also contained in the surfactant/water mixture. These surfactant/water impregnated rawhide chews provide enhanced physical cleaning.

The "impregnating" of rawhide chews with emulsions of the present invention, such as MICRODENT® and/or ULTRAMULSION®, requires augmenting by physical disrupting/penetrating means in order to provide "impregnating" substantially throughout the rawhide.

In a preferred embodiment of the intention, various rawhides are subjected to mechanical force in the form of needles and/or punches in the presence of a liquid containing the oral care actives of the invention to prepare a rawhide chew that is substantially impregnated throughout with these substances. This simultaneous physical disruption/penetration of the rawhide in the presence of the impregnating substance allows the treatment to force the substances substantially throughout the rawhide to be released gradually during chewing.

In addition to the MICRODENT® and/or ULTRAMULSION®, various other ingredients that are soluble or dispersible in said emulsions can be "impregnated" throughout the rawhide chew. These include:

toothpaste ingredients including anti-tartar ingredients including: sodium hexametaphosphate, tetrasodium pyrophosphate, various other pyrophosphates and sequestering agents, etc., whitening ingredients such as calcium peroxide, carbamide peroxide, etc., cationic antimicrobials such as chlorhexidine diacetate, chlorhexidine digluconate, cetylpyridinium chloride, domiphen bromide, benzalkonium chloride, benzethonium chloride, and alexidine, other antimicrobials such as triclosan, sodium hypochlorite, metronidazole, various peroxides, anti-caries ingredients including: sodium fluoride, fluorohexametaphosphate, stannous fluoride, etc., antibiotics, antiseptics, coagulants, vitamins, nutraceuticals, etc., flavorants and mouth conditioners, and abrasives.

"Impregnating" these various other ingredients substantially throughout the rawhide chew. As distinguished from coating the surface of the chew with these ingredients allows the impregnated ingredients to be available consistently to the oral cavity of the pet at effective levels; over the chew-life of the rawhide pet chew. This availability of various "impregnated" ingredients consistently over the chew-life of the pet chew plays a key role in effectively controlling biofilm buildup, the fetid breath associated with biofilms and controlling the formation of tartar or calculus.

In addition to "impregnating" rawhide chews with emulsions of the present invention that contain various active ingredients, these emulsions generally will also contain various other ingredients including flavorants, conditioners, mouthfeel agents, etc., which are also "impregnated" substantially throughout the rawhide. These flavors, conditioners, mouthfeel agents, etc., tend to encourage the pet to chew the rawhide more intensely for longer periods and/or more frequently than the pet would normally do with rawhide that is not emulsion "impregnated" substantially throughout with flavorants, conditioners, mouthfeel agents, etc. Thus, flavor/conditioner mouthfeel agents/emulsion "impregnated" rawhide is a more effective means for delivering various active ingredients contained substantially throughout the rawhide, into the pet's oral cavity, than rawhide chews that are not "flavor/conditioner/mouthfeel agent/emulsion impregnated".

Further, the flavor/conditioner/mouthfeel agent/emulsion "impregnated" rawhide chews of the present invention are more effective in physically cleaning pet tooth surfaces due to the "drive-to-chew" attributed to these materials distributed substantially throughout the emulsion "impregnated" chew. This intense "drive-to-chew" prompted by the flavorant/conditioner mouthfeel agent dispersed throughout the rawhide chew results in more vigorous: chewing, gnawing, ripping and/or shredding action by the pet than is normally associated with rawhide that is not "impregnated" throughout with flavor/conditioner/mouthfeel agent/emulsions.

In addition to including flavorants, conditioners, etc., and/or active ingredients in the emulsions to be "impregnated" in rawhide chews, the present invention also includes the addition of other ingredients such as dispersible abrasives into these emulsions. The distribution substantially throughout the rawhide chew of an emulsion of MICRODENT® and/or ULTRAMIJLSION® containing anti-tartar ingredients and also containing, dispersed therein, various abrasives of various particle sizes, provides an in-situ-type toothpaste formulation that is continuously worked over tooth surfaces as the MICRODENT® and/or ULTRAMULSION® with abrasives dispersed therein is released from the "impregnated" rawhide chew over the chew life of the chew.

Release of various active ingredients from the "impregnated" rawhide chew such as chlorhexidine as described in copending patent application Ser. No. 10/361,311, filed Feb. 10, 2003, as well as various fluorides during chewing introduces off-flavors that tend to be a "turn-off" to pets. That is, the release of such off-flavors is usually associated with eventual rejection 6f the chew by the pet and failure of the pet to control bioflims. For example, unfavorable flavors such as "garlic" or a mouthfeel comparable to "galvanized metals" are associated with chlorhexidine and stannous fluoride, respectively. Both are unacceptable to most pets, and chews with these off-flavors are generally rejected by the pet.

It has been discovered that various flavorants and mouth conditioners, mouthfeel agents, etc., included in the MICRODENT® and ULTRAMULSION® emulsions "impregnated" throughout the rawhide chews neutralize certain "turn-off" flavors and adverse mouth feelings associated with various active ingredients when these ingredients are "impregnated" into rawhide chews. It has unexpectedly been found that the "impregnated" rawhide chews of the present invention containing active ingredients such as fluorides and chlorhexidine and certain neutralizing flavorants are generally preferred over untreated rawhide chews and are generally more effective in controlling pet biofilms and fetid breath.

The most effective flavorants for the "impregnated" rawhide chews of the present invention are generally unacceptable to pet owners. That is, the preferred flavors preferred by pets tends towards the odor and flavor of rotten, foul and/or decayed meats generally associated with "road kill" and dead, decaying, putrefying carcasses. These foul odors are a turn-off to pet owners and heretofore have generally been avoided for use with coated pet rawhide chews.

Surprisingly, it has been found that "road kill" flavors can be incorporated into the emulsions "impregnated" into the rawhide treats of the present invention and masked from human perception so that they are not a turn-off to pet owners; yet, are perceived by the pet. It appears the rawhide chews "impregnated" with masking flavorant containing emulsions "mask" these putrification-based flavors inside the "impregnated" rawhide for release when the rawhide is masticated. This release of masked "road kill"-type flavors during mastication of the rawhide chew motivates most pets to chew: (a) more vigorously, (b) longer and (c) more frequently with a corresponding improvement in biofilms control.

The process for "impregnating" rawhide (fresh, dried or comminuted) with the various emulsions, surfactants, flavorants, actives and/or conditioners, includes physical penetration/disruption of the rawhide chew, followed by soaking/"marinating" the physically disrupted/penetrated rawhide under a wide range of conditions including:

Soaking baths with various emulsions, surfactants, flavorants, actives and/or conditioners at levels from between about 0.1% and about 50% by weight of the soaking medium. Particularly preferred are emulsion levels between about 0.1 and about 30% by weight of the soaking medium.

Soaking temperatures from between room temperature and about 100° C. (i.e., 212° F.).

Soaking durations from between about 30 minutes and about 24 hours.

Soaking agitation conditions ranging from intermittent to constant.

Soaking pressures ranging from open vessels under no additional pressure to closed pressurized systems at from between about 10 and about 100 psi.

Rinsing to remove various substances used in "impregnating" the rawhide from the surface of the rawhide so that the surface contains a minimum of those substances that have been used to "impregnate" the rawhide.

Drying with and without forced air at temperatures from between room temperature and about 85° C. for periods ranging from between about 4 hours and 48 hours.

Tables 1 through 3 include illustrative Examples 1 through 21 of the present invention, where various types and shapes of various disrupted/penetrated rawhide chews are impregnated with various substances under a wide range of soaking and drying conditions. The substances disclosed include a wide range of coating substances. These are particularly useful for treating various dried rawhide pet chews.

TABLE 1

Emulsion Impregnated Dried Rawhide Chews

| Ex. No. | Type of Penetration (Reference is to FIGS. 1–5) | Emulsifying Surfactant (% of total solids) | Coating Agent in Emulsion (% of total solids) | Other ingredients in Solution (% total solids) | Conditioners (% of total solids) | Total Solids in Impregnation Solution | Impregnation Conditions | | | | Rinsing with warm water (duration in sec) | Drying Temp in ° F./ time in hr |
|---|---|---|---|---|---|---|---|---|---|---|---|---|
| | | | | | | | Temp ° F. | Time in hrs | Agitation | Pressure (in psi) | | |
| 1 | fibrillated slits (1) | poloxamer 407 (80) | PDMS[1] (8) | Fluoride (0.2) TSPP[2] (8.8) | Hydroxy propyl cellulose (3.2) | 20 | room temp | 1 | constant | 100 | none | 170/16 |
| 2 | closely spaced needle holes (2) | poloxamer 407 (70) | PDMS[1] (7) | SHMP[3] (8) Silica gel (5) | carboxy methyl cellulose (10) | 25 | room temp | 2 | none | none | 5 | 140/24 |
| 3 | widely spaced needle holes (3) | poloxamer 407 (60) SLS[5] (10) | PDMS[1] (6) | CPC[4] antimicrobial (3) TSPP (8.8) | Gantrez resin (10) | 10 | 120 | 4 | intermittent | 50 | 10 | 180/24 |
| 4 | drilled holes (4) | poloxamer 407 (70) | PDMS[1] (7) | Baking soda (13) TSPP (10) | none | 20 | 150 | 8 | intermittent | none | 5 | 130/48 |
| 5 | punched holes (5) | poloxamer 407 (60) | PDMS[1] (12) | abrasive (12) | hydrogenated glucose syrup (16) | 15 | room temp | 12 | constant | 10 | 10 | 130/24 |
| 6 | fibrillated slits (1) | poloxamer 407 (80) | PDMS[1] (8) | Co-Enzyme Q-10 (1) Vitamin E (0.5) | Wheat gluten (10.5) | 40 | room temp | 16 | none | none | none | 120/36 |
| 7 | closely spaced needle holes (2) | Pluronic ® F 108 (80) PEG Stearate (2) | microwax (5) | conditioner (4) | PEG 8000 (9) | 40 | 100 | 24 | none | none | 5 | 140/24 |

NOTE:
Pet Flavors to taste throughout
[1] Polydimethylsiloxane (2.5 million cs)
[2] tertrasodium pyrophosphate
[3] sodium hexametaphosphate
[4] cetylpyridinium chloride
[5] Sodium lauryl Sulfate

TABLE 2

Emulsion Impregnated Fresh Wet Rawhide Chews

| Ex. No. | Type of Penetration (Reference is to FIGS. 1–5) | Coating Emulsifying Surfactant (% of total solids) | Coating Agent in Emulsion (% of total solids) | Other ingredients in Solution (% total solids) | Conditioners (% of total solids) | Total Solids in Impregnation Solution | Impregnation Conditions Temp ° F. | Impregnation Conditions Time in hrs | Impregnation Conditions Agitation | Impregnation Conditions Pressure (in psi) | Rinsing with warm water (duration in sec) | Drying Temp in ° F./ time in hr |
|---|---|---|---|---|---|---|---|---|---|---|---|---|
| 8 | widely spaced needle holes (3) | poloxamer 407 (80) | PDMS[1] (8) | Fluoride (0.2) TSPP[2] (8.8) | Hydroxy propyl cellulose (3) | 20 | room temp | 1 | constant | 100 | none | 130/48 |
| 9 | drilled holes (4) | poloxamer 407 (70) | PDMS[1] (14) | SHMP[3] (8) Silica gel (8) | none | 25 | room temp | 2 | none | none | 5 | 140/48 |
| 10 | punched holes (5) | poloxamer 407 (60) SLS[5] (10) | PDMS[1] (6)] | Dicalcium phosphate (14) | Gantrez resin (10) | 10 | 120 | 4 | intermittent | 50 | 10 | 180/24 |
| 11 | fibrillated slits (5) | poloxamer 407 (70) | PDMS[1] (10) | Baking soda (13) TSPP (10) | carboxy methyl cellulose (10) | 20 | 150 | 8 | intermittent | none | 5 | 130/36 |
| 12 | closely spaced needle holes (2) | poloxamer 407 (60) | microwax (12) | carbamide peroxide (12) | hydrogenated glucose syrup (16) | 15 | room temp | 12 | constant | 10 | 10 | 120/36 |
| 13 | widely spaced needle holes (3) | poloxamer 407 (80) | PDMS[1] (8) | Co-Enzyme Q-10 (1) Vitamin E (0.5) | Wheat gluten (10.5) | 40 | room temp | 16 | none | none | none | 170/24 |
| 14 | drilled holes (4) | Pluronic ® F 108 (70) PEG Stearate (3.2) | PDMS[1] (5) ethyl vinylidene acetate (5) | CPC[4] antimicrobial (3) TSPP (8.8) | PEG 8000 (5) | 40 | 100 | 24 | none | none | 5 | 130/30 |

NOTE:
Pet Flavors to taste throughout
[1] Polydimethylsiloxane (2.5 million cs)
[2] tertrasodium pyrophosphate
[3] sodium hexametaphosphate
[4] cetylpyridinium chloride
[5] Sodium lauryl Sulfate

TABLE 3

Examples of Toy Forms
Emulsion Impregnated Rawhide Chews

| Ex. No. | Types of Chews | Type of Penetration (Reference is to FIGS. 1–5) | Emulsion Type (level of PDMS in %) [concentration of emulsion in %] | Other ingredients in Emulsion (% by wt) | Water Soak Conditions Temp ° F. | Water Soak Conditions Time (in hrs) | Water Soak Conditions Agitation | Water Soak Conditions Pressure (in psi) | Rinsing with warm water (duration in min) | Drying Temp in ° F./ time in hr |
|---|---|---|---|---|---|---|---|---|---|---|
| 15 | fresh 5" log roll, 3" diameter | punched holes (5) | poloxamer 407 (1) [5] | toothpaste (5) | room temp | 0.5 | constant | 100 | none | 130/36 |
| 16 | dried 5" log roll 3" diameter | Drilled holes (4) | poloxamer 407 (2) [10] | whitening (8) | room temp | 1 | constant | 50 | 5 | 140/24 |
| 17 | fresh open twist | fibrillated slits (1) | poloxamer 407 (5) [4] | antimicrobial (3) | 100 | 4 | intermittent | 50 | 10 | 180/24 |
| 18 | dried open twist | closely spaced needle holes (2) | poloxamer 407 (10) [3] | anti-caries (4) | room temp | 8 | intermittent | 10 | 5 | 150/48 |
| 19 | fresh tight twist | widely spaced needle holes (3) | poloxamer 407 (10) [8] | abrasive (12) | 120 | 12 | constant | 10 | 10 | 140/24 |
| 20 | dried tight twist | punched holes (5) | poloxamer 407 (5) [20] | vitamin (6) | room temp | 16 | none | none | none | 180/16 |
| 21 | pressed stick | — | poloxamer 407 (2) [30] | conditioner (4) | room temp | 24 | none | none | 5 | 130/36 |

EXAMPLE 22

Squares of dried rawhide, 3 inches by 3 inches, are soaked in the impregnation solution of Example 4 until flexible. They are then fed into the nip between two rollers. The top roller, 6 inches in diameter, is fitted with hollow punch needles of about ¼ inch long and ⅛ inch in diameter at the base spaced every ¼ inch around the roller. The bottom roller is fitted with a polyurethane sleeve against which the punch needles contact after cutting through the rawhide. The rawhide pieces are removed from the top roller with a sliding shoe and transferred back to the impregnation solution of Example 4 for the remainder of the impregnation time. They are then dried at 130° F. for 48 hours. The rawhide pieces are dry to the touch and colorless. As the dog chews the rawhide sample, MICRODENT® (Poloxamer I-PDMS) and other agents are released, while no visible contamination is transferred to the carpet.

EXAMPLE 23

Sections of fresh rawhide about 18 inches by 36 inches are placed in a press having its upper plate fitted with hollow punch needles about ½ inch long and 1/16 inches in diameter and ¼ inches in diameter according to FIG. 5 The lower plate of the press is a high impact polyurethane sheet against which the press punches compress after cutting through the fresh rawhide. The fresh rawhide is then soaked impregnated according to Example 1. After impregnation, the fresh rawhide is cut to any desired size and shaped as required. It is then dried in a manner appropriate for the size and thickness of the piece.

What is claimed is:

1. Bioflim disrupting rawhide pet chews comprising physically disrupted and/or penetrated rawhide, impregnated with an emulsion comprising a coating substance as the discontinuous phase and a surfactant as the continuous phase, wherein:
    (a) said emulsion is present substantially throughout said rawhide at from between about 0.1 and about 3000 by weight,
    (b) said impregnated rawhide helps control biofilm formation in the oral cavity of pets due to release of the emulsion during use, and
    (c) other ingredients present throughout said impregnated rawhide encourage pet chewing.

2. Rawhide pet chews according to claim 1, wherein said rawhide is selected from the group consisting of fresh rawhide, dried rawhide, compressible rawhide, comminuted rawhide and mixtures thereof.

3. Rawhide pet chews according to claim 1, wherein said emulsion is comprised of a surfactant substance as the continuous phase selected from the group consisting of:
    sodium lauryl sulfate,
    sodium lauryl sarcosinate,
    polyethyleneglycol stearate,
    polyethyleneglycol mono stearate,
    coconut monoglyceride sulfonates,
    soap powder,
    sodium alkyl sulfates,
    sodium alkyl sulfoacetates,
    alkyl polyglycol ether carboxylates,
    polyoxyethylene derivatives of sorbitan esters,
    propoxylated cetyl alcohol,
    polyoxyethylene-polyoxypropylene block copolymers,
    polysorbates,
    block copolymers comprising a congeneric mixture of conjugated polyoxypropylene and polyoxyethelene compounds having a hydrophobe,
    polyoxypropylene polymers of at least 1200 molecular weight;
    and mixtures thereof.

4. Rawhide pet chews according to claim 1, wherein said other ingredients present at from between about 0.1% and about 20% are selected from the group consisting of toothpaste, whitening, antimicrobial, anti-caries, antibiotic, flavor, conditioner, abrasive ingredients and mixtures thereof.

5. Physically disrupted/penetrated rawhide pet chews soaked in a bath comprised of water and an emulsion comprising a coating substance as the discontinuous phase and a surfactant as the continuous phase at a soaking temperature ranging from room temperature up to 212° F. and for a soaking time ranging from 0.5 hour up to 24 hours, such that
    said emulsion permeates substantially throughout the rawhide imparting plasticizing and enhanced efficacy with respect to controlling biofilms;
wherein,
    (a) said emulsion is present substantially throughout said rawhide at from between about 0.1% and about 30% by weight,
    (b) said impregnated rawhide helps control biofilm formation in the oral cavity of pets, and
    (c) other ingredients present throughout said impregnated rawhide encourage pet chewing; and
wherein,
    said emulsion is comprised of a coating substance as the discontinuous phase selected from the group consisting of:
    silicone glycol co-polymers,
    polydimethyl siloxanes at molecular weights up to 2.5 million cs,
    long chain hydrocarbons, especially normal paraffins having a chain length of 16 carbon atoms or greater,
    paraffins with several loci of branching and unsaturation does not create unacceptable toxicity nor lower the solidification point below body temperature,
    polyethylene glycols and
    polymers which have limited solubility in ethanol and water solutions where the ethanol or water ratio is greater than 0.3:1 but have essentially no solubility in water or saliva at lower ratios; and mixtures thereof.

6. A method for helping to control biofilm formation in the oral cavity of pets comprising periodically providing the pet with an emulsion impregnated rawhide pet chew, wherein:
    (a) the emulsion is comprised of a surfactant continuous phase and a coating substance as the discontinuous phase,
    (b) the emulsion is present substantially throughout said pet chew, and
    (c) the rawhide impregnating is achieved by various physical penetrating/disrupting means selected from the group consisting of star-shaped, bone-shaped, round-shaped, random-shaped penetrating means and combinations thereof
    (d) and wherein said impregnated rawhide helps control biofilm formation in the oral cavity of pets due to release of the emulsion during use.

7. A method for impregnating dried rawhide pet chews with an emulsion comprising the steps of physically penetrating said chew and soaking said chew in an aqueous bath containing an emulsion comprised of surfactant as the continuous phase and a coating substance as a discontinuous phase, wherein:
- (a) said soaking is carried out at a soaking temperature ranging from room temperature up to 212° F. and for a soaking time ranging from 0.5 hour up to 24 hours, such that said emulsion impregnates said rawhide at from between about 0.1 and 30% by weight, and
- (b) said emulsion contains various other ingredients selected from the group consisting of toothpaste, whitening, antimicrobial, anti-caries, antibiotic, flavor, conditioner, mouthfeel, abrasive ingredients and mixtures thereof, that are released during use.

8. A method according to claim 7, wherein dried penetrated/disrupted rawhide is impregnated using an aqueous soak at temperatures ranging from between about room temperature and up to about 80° C. for between about 1 hour and about 24 hours.

9. A method according to claim 7, wherein the impregnated pet chew is redried at a temperature ranging from between about 70° F. and about 140° F.

10. A method for impregnating fresh rawhide pet chews with an emulsion comprising the steps of physically penetrating/disrupting said rawhide and soaking said rawhide in an aqueous bath containing an emulsion comprised of surfactant as the continuous phase and a coating substance as a discontinuous phase, wherein:
- (a) said soaking is carried out at a soaking temperature ranging from room temperature up to 212° F. and for a soaking time ranging from 0.5 hour up to 24 hours, such that said emulsion impregnates said rawhide at from between about 0.1 and 30% by weight, and (b) said emulsions contain various oral care ingredients that are released during use.

11. A method according to claim 10, wherein fresh rawhide is marinated in an aqueous soak at temperatures ranging from between about room temperature and up to about 100° C. for between about 1 hour and about 24 hours.

12. A method according to claim 10, wherein the impregnated pet chew is redried at a temperature ranging from between about 70° F. and about 140° F.

13. A method of enhancing palatability of rawhide pet chews comprising periodically providing the pet with an emulsion impregnated rawhide pet chew, wherein:
- (a) the emulsion is comprised of a surfactant continuous phase and a coating substance as the discontinuous phase,
- (b) the emulsion is present throughout said pet chew,
- (c) the rawhide impregnating is achieved by various physical penetrating/disrupting means selected from the group consisting of star-shaped, bone-shaped, round-shaped, random-shaped penetrating means and combinations thereof,
- (d) and wherein said impregnated rawhide provides enhanced palatability due to release of the emulsion during use.

14. A treatment for pet gum disease comprising periodically providing the pet with an emulsion impregnated rawhide pet chew, wherein:
- (a) the emulsion is comprised of a surfactant continuous phase and a coating substance as the discontinuous phase,
- (b) the emulsion is present throughout said pet chew,
- (c) the rawhide impregnating is achieved by various physical penetrating/disrupting means selected from star-shaped, bone-shaped, round-shaped, random-shaped penetrating means and combinations thereof,
- (d) and wherein said impregnated rawhide helps treat pet gum disease due to release of the emulsion during use.

15. A method for improving dried rawhide pet chews comprising the steps of impregnating said chew and soaking said rawhide in an aqueous bath containing an emulsion comprised of surfactant as the continuous phase and a coating substance as a discontinuous phase, wherein:
- (a) said soaking is carried out at a soaking temperature ranging from room temperature up to 212° F. and for a soaking time ranging from 0.5 hour up to 24 hours, such that said emulsion impregnates said rawhide at from between about 0.1 and 30% by weight, and
- (b) said emulsion contains various other ingredients selected from the group consisting of toothpaste, whitening, antimicrobial, anti-caries, antibiotic, flavor, conditioner, abrasive ingredients and mixtures thereof that are released during use.

16. A method for plasticizing dried rawhide pet chews comprising the steps of impregnating dried rawhide pet chews with an emulsion by physically penetrating said chew and soaking said rawhide in an aqueous bath containing an emulsion comprised of surfactant as the continuous phase and a coating substance as a discontinuous phase, wherein:
- (a) said soaking is carried out at a soaking temperature ranging from room temperature up to 212° F. and for a soaking time ranging from 0.5 hour up to 24 hours, such that said emulsion impregnates said rawhide at from between about 0.1 and 30% by weight, and
- (b) said emulsion contains various other ingredients selected from the group consisting of toothpaste, whitening, antimicrobial, anti-caries, antibiotic, flavor, conditioner, abrasive ingredients and mixtures thereof, that are released during use.

17. A method for enhancing the texture of dried rawhide pet chews comprising the steps of impregnating dried rawhide pet chews with an emulsion by physically penetrating said chew and soaking said rawhide in an aqueous bath containing an emulsion comprised of surfactant as the continuous phase and a coating substance as a discontinuous phase, wherein:
- (a) said soaking is carried out at a soaking temperature ranging from room temperature up to 212° F. and for a soaking time ranging from 0.5 hour up to 24 hours, such that said emulsion impregnates said rawhide at from between about 0.1 and 30% by weight, and
- (b) said emulsion contains various other ingredients selected from the group consisting of toothpaste, whitening, antimicrobial, anti-caries, antibiotic, flavor, conditioner, abrasive ingredients and mixtures thereof, that are released during use.

18. A method for enhancing the texture of fresh rawhide pet chews comprising the steps of impregnating fresh rawhide pet chews with an emulsion by physically penetrating/disrupting said rawhide and soaking said rawhide in an aqueous bath containing an emulsion comprised of surfactant as the continuous phase and a coating substance as a discontinuous phase, wherein:
- (a) said soaking is carried out at a soaking temperature ranging from room temperature up to 212° F. and for a soaking time ranging from 0.5 hour up to 24 hours, such that said emulsion impregnates said rawhide at from between about 0.1 and 30% by weight, and
- (b) said emulsions contain various oral care ingredients that are released during use.

* * * * *